United States Patent
Ray-Chaudhuri et al.

[15] 3,678,035
[45] July 16, 1972

[54] CARBOXAMIDO-AZIRIDINE COMPOUNDS

[72] Inventors: Dilip K. Ray-Chaudhuri, Somerset; Hans H. Stockmann, Plainfield, both of N.J.

[73] Assignee: National Starch and Chemical Corporation, New York, N.Y.

[22] Filed: July 15, 1970

[21] Appl. No.: 55,137

Related U.S. Application Data

[63] Continuation-in-part of Ser. No. 690,838, Dec. 15, 1967, abandoned.

[52] U.S. Cl. ..........................................260/239 E, 162/158
[51] Int. Cl. ........................................................C07d 23/08
[58] Field of Search ........................162/164, 168, 182, 158; 260/239 E, 2 EN; 8/116.2, 116.3; 117/155

[56] References Cited

UNITED STATES PATENTS

3,066,997  12/1962  Neher et al. ..........................260/471

OTHER PUBLICATIONS

Elderfield, J. Org. Chem., vol. 26, pages 1917– 1923 (1961)
Smith, Open-Chain Nitrogen Compounds, vol. 2, pages 239–242 (New York, 1966).

*Primary Examiner*—Leon S. Bashore
*Assistant Examiner*—Richard H. Anderson
*Attorney*—Thomas B. Graham

[57] ABSTRACT

Carboxamido-aziridine compounds comprising the products resulting from the reaction of an alkylenimine such as ethylenimine with an intermediate adduct comprising the reaction product of an non-florinated alcohol reagent such as lauryl alcohol and a polyisocyanate reagent such as tobylene diisocyanate. The resulting carboxamido compounds impart water repellency to a wide variety of substrates.

1 Claim, 1 Drawing Figure

Patented July 18, 1972
3,678,035
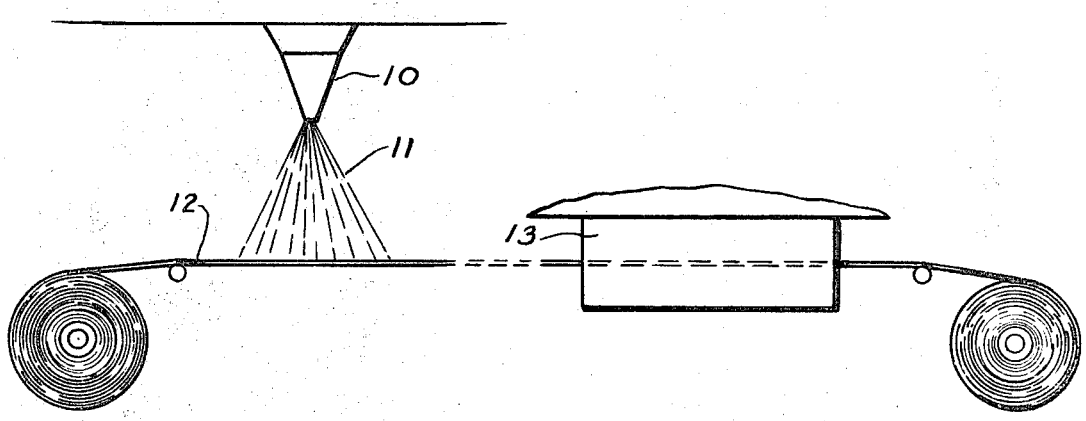
INVENTORS
DILIP K. RAY-CHAUDHURI
HANS H. STOCKMANN
BY
ATTORNEY

CARBOXAMIDO-AZIRIDINE COMPOUNDS

RELATED APPLICATION:

This application is a continuation-in-part of our co-pending application Ser. No. 690,838, filed Dec. 15, 1967 and assigned to the assignee of the instant application, now abandoned.

SUMMARY OF THE INVENTION

It is the object of this invention to prepare novel carboxamido-aziridine compounds which when utilized to treat substrates exhibiting either fibrous, porous or continuous surfaces, such as paper, textiles, felts, etc., will provide such substrates with a high degree of water repellency. Various other objects of this invention will become apparent to the practitioner from the following description thereof.

Thus, the products of this invention comprise the novel carboxamido-aziridine compounds corresponding to the formulas:

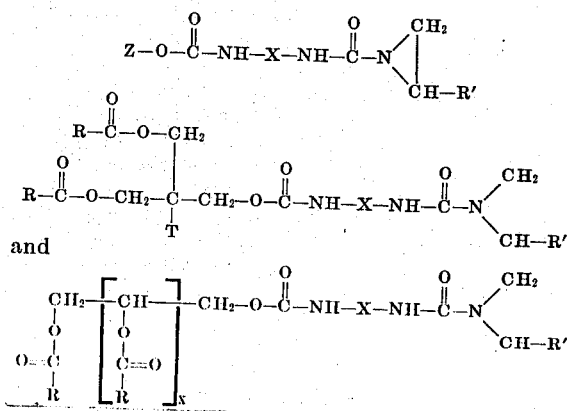

and wherein

Z is a radical selected from the group consisting of straight chained and branched alkyl radicals corresponding to the formula $C_nH_{(2n+1)}$ wherein n is an integer having a value of from 1 to 22 inclusive, cycloaliphatic radicals, and, ar-alkyl radicals;

R is a radical selected from the group consisting of straight chained and branched alkyl radicals corresponding to the formula $C_nH_{(2n+1)}$ wherein n is an integer having a value of from 1 to 22 inclusive, cycloaliphatic radicals and ar-alkyl radicals;

R' is a radical selected from the group consisting of hydrogen radicals and alkyl radicals containing from one to two carbon atoms;

X is a radical selected from the group consisting of alkylene radicals corresponding to the formula $(CH_2)_a$ wherein a is an integer having a value of from 2 to 6 inclusive; tolylene, i.e.

radicals; naphthylene, i.e.

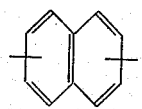

radicals;

methylene-bis-(phenyl), i.e.

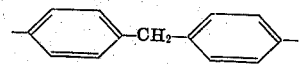

radicals; propylene-bis-(phenyl), i.e.

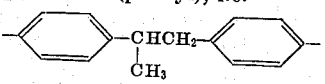

radicals; methylene-bis-cyclohexyl, i.e.

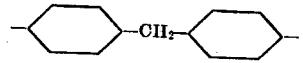

radicals; methyl cyclohexylene, i.e.

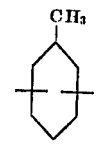

radicals; isophorone, i.e.

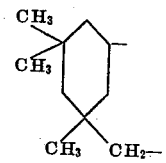

radicals; 3,4-diamyl-5-(2-undecenylene)-6-nonylene-1-cyclohexene, i.e.

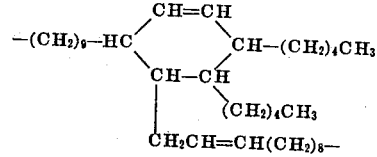

radicals; phenylene, i.e.

radicals; diphenylene, i.e.

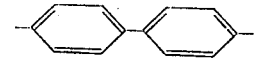

radicals; xylylene, i.e.

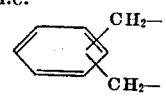

radicals; cyclopentylene, i.e.

radicals; and cyclohexylene, i.e.

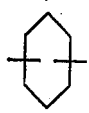

radicals;

T is a radical selected from the group consisting of hydrogen, methyl, ethyl and acyloxy methyl radicals wherein the acyloxy component of the latter radicals contains from two to 23 carbon atoms; and x is an integer having a value of from 1 to 4 inclusive.

The drawing illustrates one mode of application of the material to substrates.

As previously noted, substrates which have been treated with the novel aziridine compounds of this invention exhibit excellent water repellency. Among the primary advantages derived from the use of these additives are included:

1. The applicability of these additives to a wide variety of substrates;

2. The prolonged retention of the water repellent properties imparted by these novel additives;

3. The ease with which substrates may be treated with these additives;

4. The enhanced strength and hand which is also imparted to treated textiles; and, 5. The lactic acid, ink and sodium hydroxide resistance which is also imparted to treated paper products.

DESCRIPTION OF THE PREFERRED EMBODIMENT:

In brief, the procedure for preparing the novel carboxamido-aziridine compounds of this invention comprises reacting:

1. an alcohol with
2. a polyisocyanate and, thereafter, reacting the resulting intermediate isocyanate adduct with an alkylenimine.

The alcohol reagents applicable for use in the process of this invention correspond to the following formulas:

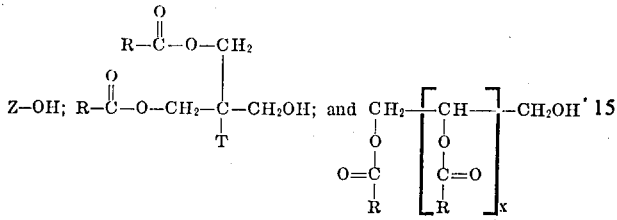

wherein

Z is a radical selected from the group consisting of straight chained and branched alkyl radicals corresponding to the formula $C_nH_{(2n+1)}$ wherein $n$ is an integer having a value of from 1 to 22 inclusive, cycloaliphatic radicals, and ar-alkyl radicals;

R is a radical selected from the group consisting of straight chained and branched alkyl radicals corresponding to the formula $C_nH_{(2n+1)}$ wherein $n$ is an integer having a value of from 1 to 22 inclusive, cycloaliphatic radicals and ar-alkyl radicals;

T is a radical selected from the group consisting of hydrogen, methyl, ethyl and acyloxy methyl radicals wherein the acyloxy component of the latter radicals contains from two to 23 carbon atoms; and, $x$ is an integer having a value of from 1 to 4 inclusive.

Thus, among the applicable alcohol reagents are included: methanol, ethanol, 2-ethylhexanol, dodecanol, tetradecanol, hexadecanol, octadecenol, docosanol, benzyl alcohol, phenethyl alcohol, cyclohexanol, tetrahydroabietyl alcohol, hydroabietyl alcohol and dihydroabietyl alcohol.

In addition, the alcohols resulting from the reaction of a wide variety of carboxylic acids corresponding to the formula Z—COOH, wherein Z is a previously described, e.g. lauric acid, myristic acid, and stearic acid, with either alkylene oxides such as ethylene oxide and propylene oxide; diols, including polyester and polyether diols, such as ethanediol-1,2 and propanediol-1,3; triols such as trimethylol ethane and trimethylol propane; tetrols such as erythritol and pentaerythritol; or, hexols such as sorbitol; are also applicable for use in the novel process of this invention. In each instance, the conditions utilized for the specified reaction are controlled so as to prepare alcohols which contain only one hydroxyl group per molecule which is available for subsequent reaction with the isocyanate groups. Among the applicable alcohol reagents thereby prepared are included:

1,1-di-octadecanoyloxymethyl, 1-hydroxymethyl ethane, i.e.

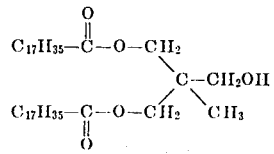

tri-octadecanoyl pentaerythritol, i.e.

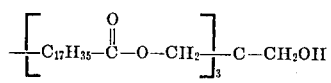

and, penta-octadecanoyl sorbitol.

Although the use of secondary alcohols, i.e. alcohols containing a —CHOH— group, is reflected neither in the generic formulas given hereinabove for the products of this invention nor in the above specified list of alcohol reagents, it is to be noted that such alcohols are applicable for use in preparing the products of this invention and are deemed to be included within the scope thereof.

Among the isocyanate reagents applicable for use in the novel process of this invention are included: polyisocyanates such as 2,4-tolylene diisocyanate, 2,6-tolylene diisocyanate, mixtures of the latter tolylene diisocyanates, hexamethylene diisocyanate, ethylene diisocyanate, trimethylene diisocyanate, long chain dialkyl diisocyanates, methylene-bis-phenyl isocyanate, propylene-bis-phenyl isocyanate, methylene-bis-cyclohexyl diisocyanate, methyl cyclohexylene diisocyanate, polymethylene polyphenyl isocyanate, naphthalene diisocyanate, p-phenylene diisocyanate, xylylene diisocyanate, cyclohexylene diisocyanate, butylidene diisocyanate, cyclopentylene diisocyanate, isophorone diisocyanate and 3,4-diamyl-5-(2-undecenylene)-6-nonylene-1-cyclohexane diisocyanate. It is to be noted that the tolylene diisocyanates are the preferred isocyanate reagents for use in the process of this invention.

Furthermore, the 3,4-diamyl-5-(2-undecenylene)-6-nonylene-1- cyclohexene diisocyanate mentioned hereinabove is generally available as the predominant component of a commercial dimer diisocyanate blend manufactured by General Mills. Accordingly, it is to be understood that where the named diisocyanate appears in the specification and claims herein, it is intended to represent both the specific named product as well as the commercial blend.

In addition, compounds whose molecules contain more than two isocyanate groups may also be utilized in the novel process of this invention in order to prepare carboxamidoazirdine compositions which exhibit water repellent properties. Among the latter isocyanate compounds are included: p,p',p''-triphenylmethane triisocyanate, diphenyl-4,6,4'-triisocyanate, and polymethylene polyphenyl isocyanates as well as the reaction products of polyhydric alcohols with an excess of a diisocyanate, e.g. the reaction product of trimethylol propane with an excess of tolylene diisocyanate.

The alkylenimines applicable for use in the process of this invention correspond to the formula:

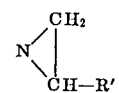

wherein R' is a radical selected from the group consisting of hydrogen radicals and alkyl radicals containing from one to two carbon atoms. Specific alkylenimines include: ethylenimine, propylenimine and butylenimine.

In more detail, the procedure for the preparation of the novel compounds of this invention comprises slowly admixing the alcohol reagent and the polyisocyanate compound in stoichiometric proportions under anhydrous conditions and, preferably, in an inert atmosphere such as under gaseous nitrogen. Thereafter, the resulting mixture is heated at a temperature of from about 25° to 200°C., and preferably from about 50° to 100°C., for a period of from about one-half to 12 hours. Needless to say, the length of the reaction will depend on the reaction temperature which is utilized as well as on the specific nature of the reactants, although the above noted reaction period of from one-half to 12 hours is usually sufficient to insure completion of the reaction as evidenced by the complete removal of the free hydroxyl group from the system. The reaction may, if desired, be conducted in the presence of a solvent and/or catalyst, although their presence is not essential to the process of this invention. Typical solvents include: aromatic hydrocarbons such as benzene and toluene; aliphatic hydrocarbons such as hexane and heptane; chlorinated hydrocarbons such as chloroform and carbon tetrachloride; tertiary amines such as triethylamine and N-methyl morpholine; and, ether; while typical catalysts include; tin compounds such as stannous octanoate and dibutyl tin dilaurate; antimony compounds such as antimony octanoate and antimony naphthenate; and lead compounds such as lead octanoate, etc.

In most instances, the resulting reaction products, which comprise the intermediates to be further reacted so as to lead to the preparation of our novel carboxamide-aziridine compounds, are low melting solids which are soluble in such organic solvents as benzene and toluene. These intermediates should always contain at least one active isocyanate group which is available for subsequent reaction with the alkylenimine. It is to be noted that these intermediate isocyanate adducts exhibit some utility as water repellency agents.

Thereafter, the selected alkylenimine is added to one of the above prepared intermediate products; the latter product being in the form of either the clear solution in which it was originally prepared or in the form of a subsequently prepared organic solvent solution. The reaction temperature of the system is then raised to about 25° to 150°C., and preferably to about 50° to 80°C., and maintained at that level for a period of from about one-half to 12 hours, depending upon the reaction conditions being utilized. The completion of the reaction may be determined by following the disappearance of the isocyanate absorption band on an infra-red spectrum of the end product. Upon completion of the reaction, the solvent is removed from the system thereby yielding the carboxamide-aziridine compound in the form of a low melting, colorless solid. The resulting products are generally soluble in acetone, alcohols, alcohol-benzene mixtures and chlorinated solvents. They can be stored for an unlimited period of time either by being maintained at temperatures below about 5°C. or by being kept at room temperature in the form of 20 to 30 percent, by weight, alcohol or acetone-dichloromethane solutions.

With respect to proportions, the determination of the precise concentration of the three primary ingredients in relation to one another, as based on the stoichiometric equivalencies of the two reactions, is left to the discretion of the practitioner, it being necessary in determining these proportions to insure that the intermediate product contains at least one isocyanate group which is available for reaction with the alkylenimine and that a sufficient concentration of alkylenimine is present in order to convert the latter isocyanate groups into N-carbamoyl aziridine groups. However, typical proportions for the preparation of the intermediates include the reaction of from about 0.5 to 0.9 moles of the alcohol with approximately one mole of the polyisocyanate, with the resulting intermediate thereafter being reacted with from about 0.5 to 1.1 moles of alkylenimine for each mole of polyisocyanate utilized in the preparation of the intermediate product. In addition, it should be noted that more than one carboxamido-aziridine group may be present on the novel compositions of this invention without departing from the scope thereof.

The novel additives of this invention may be effectively utilized to treat a virtually unlimited variety of solid materials regardless of whether they exhibit fibrous, porous or continuous surfaces. Among such materials are included: textiles derived from wool, cotton, polyester, nylon, polyacrylonitrile and other synthetic fibers, glass paper, wood, leather, fur, asbestos, brick, concrete, metal, ceramics, plastics as well as painted and plastered surfaces. Thus, for purposes of convenience, when reference is hereinafter made to "applying to" or to "treating" or to the "treatment" of such substrates, the latter terms are meant to encompass the coating and/or impregnation of porous substrates and the coating of impervious substrates as well as the internal sizing of cellulosic substrates.

The latter materials may be treated by means of any effective technique whose use is desired by the practitioner.

In the drawing, the spray on solution technique is shown. Reservoir 10 carries solution which forms spray 11 directed onto substrate 12, passing thereunder into drier 13 to be rolled again.

Thus, for example, textiles and leather goods are typically treated by a "padding" technique wherein the substrate is passed through an organic solvent solution of a novel aziridine product of this invention, squeezed through a nip and then briefly heated to evaporate the solvent. Typical organic solvents include toluene, 1,2-dichloroethane, and perchloroethylene, etc. The treated substrate is subsequently cured by being heated at a temperature of from about 60° to 180°C. for a period of about 5 to 10 minutes, thereby developing total water repellency. A Lewis acid catalyst, such as aluminum chloride, may be optionally present in order to enhance the latter curing operation. In addition, such surface coating techniques as spraying and brushing may also be effectively utilized in order to deposit a film of the repellent on the surface of the substrate.

In addition, it is to be noted that the carboxamidoaziridine compounds of this invention may be applied to the desired substrates while they are in the form of an aqueous emulsion, it being merely necessary to select an appropriate emulsifier for the system. Suitable emulsifiers include, for example, salts of long chain alkyl amines such as stearyl dimethyl ammonium acetate.

The amount of additive which is required to provide adequate water repellency to such substrates as textiles and leathers, etc. will vary according to the particular repellent being used, the selected substrate and the specific end-use application of the resulting treated product, although the presence of as little as about 0.5 percent of the additive, based on the weight of the substrate, will ordinarily provide sufficiently improved water repellency.

Furthermore, the actual use of our novel water repellents as internal sizing agents in the manufacture of paper is subject to a number of variations in technique, any of which may be further modified in light of the specific requirements of the practitioner. It is important to emphasize, however, that will all of these procedures, it is most essential to achieve a uniform dispersal of the repellent throughout the fiber slurry. Uniform dispersal may be obtained by adding the repellency agent in a fully dispersed form such as an emulsion; or, by the co-addition of chemical dispersing agents to the fiber slurry.

Another important factor which may be taken into consideration in the effective utilization of the water repellents of this invention involves their use in conjunction with a material which is either cationic in nature or is, on the other hand, capable of ionizing or dissociating in such a manner as to produce one or more cations or other positively charged moieties. These cationic agents, as they will be hereinafter referred to, have been found useful as a means for aiding in the retention of our novel derivatives as well as for bringing the latter into close proximity to the pulp fibers. Among the materials which may be employed as cationic agents in the process of this invention, one may list: long chain fatty amines; polyamines; polyacrylamide; polyethylenimine and its derivatives; copolymers of ethylenimine with various monomers such as diethyl aminoethyl methacrylate; chromic sulfate; sodium aluminate; animal glue; cationic thermosetting resins such as the reaction products of dibasic carboxylic acids, polyalkylene polyamines and epihalohydrins; and, polyamide polymers and copolymers. Of particular interest for use as cationic agents are various cationic starch derivatives including primary, secondary, tertiary and quaternary amine starch derivatives and other cationic nitrogen substituted starch derivatives, as well as cationic sulfonium and phosphonium starch derivatives. Illustrative of such cationic starches are the products whose preparation is described in U.S. Pat. Nos. 2,813,093; 2,989,520; and 3,077,469. Such derivatives may be prepared from all types of starches including corn, tapioca, potato, waxy maize, wheat and rice. Moreover, they may be in their original granule form or they may be converted to pregelatinized, cold water soluble products.

Any of the above noted cationic agents may be added to the stock, i.e. the pulp slurry, either prior to, along with or after the addition of the water repellent. However, in order to achieve maximum distribution, it is preferable that the cationic agent be added either subsequent to or in direct combination with the repellent. The actual addition to the stock of either the cationic agent or the sizing agent, i.e. repellent, may take place at any point in the paper making process prior to the ultimate conversion of the wet pulp into a dry web or sheet. Thus, for example, our novel derivatives may be added to the pulp while the latter is in the headbox, beater, hydropulper or stock chest.

In order to obtain good sizing, it is desirable that our novel compounds be uniformly dispersed throughout the fiber slurry in as small a particle size as is possible to obtain. One method for producing such uniform dispersions is to emulsify the sizing agent prior to its addition to the stock utilizing either mechanical means, such as high speed agitators, mechanical homogenizers, or ultrasonic homogenizers, or by the addition of a suitable emulsifying agent. The latter emulsification may, if desired, be accomplished by employing a cationic agent as the emulsifier and this procedure is particularly successful where cationic starch derivatives are utilized. Among the applicable non-cationic emulsifiers which may be used as emulsifying agents for our sizing agents, one may list such hydrocolloids as conventional starches, non-cationic starch derivatives, dextrines, carboxymethyl cellulose, hydroxyethyl cellulose, gum arabic, gelatin and polyvinyl alcohol as well as various surfactants. When such non-cationic emulsifiers are used, a cationic agent may be separately added to the pulp slurry. In preparing these emulsions with the use of an emulsifier, the latter is first dispersed in water and the sizing agent is then introduced along with vigorous agitation.

Further improvements in the water resistance of the paper prepared with the novel sizing agents of this invention may be obtained by curing the resulting webs, sheets or molded products. This curing process involves heating the paper at temperatures in the range of from 80° to 150°C. for a period of from 1 to 60 minutes. However, it should again be noted that post curing is not essential to the successful operation of these sizing processes.

The novel derivatives of this invention may, of course, be successfully utilized for the sizing of paper prepared from all types of both cellulosic and combinations of cellulosic with non-cellulosic fibers. The cellulosic fibers which may be used include bleached and unbleached sulfate (kraft), bleached and unbleached sulfite, bleached and unbleached soda, neutral sulfite, semi-chemical, chemi-groundwood, ground wood, and any combination of these fibers. These designations refer to wood pulp fibers which have been prepared by means of a variety of processes which are known in the pulp and paper industry. In addition, synthetic fibers of the viscose rayon or regenerated cellulose type as well as of the chemistry synthesized type can also be used.

All types of pigments and fillers may be added to the paper which is to be sized with our novel derivatives. Such materials include clay, talc, titanium dioxide, calcium carbonate and diatomaceous earths. Other sizing agents can also be used in conjunction with our novel derivatives. It should be noted, however, that the presence of alum is detrimental to the performance of these compounds as sizing agents. Therefore, if it is desired to prepare paper sheets at low pH levels, mineral acids should be used to adjust the pH of the fiber slurry.

With respect to proportions, our novel derivatives may be employed in amounts ranging from about 0.05 to about 5.0 percent of the dry weight of the pulp in the finished sheet or web. Within this range, the precise amount which is used will, of course, depend for the most part upon the type of pulp which is being utilized, the specific operating conditions, as well as the particular end use for which the paper is destined. Thus, for example, paper which will require good water resistance or ink holdout will necessitate the use of a higher concentration of sizing agent than paper which will be used in applications where excessive sizing is not needed. These same factors also apply in relation to the amount of cationic agent which may be used in conjunction with these repellents. Thus, the practitioner will be able to use these materials in any concentration which is found to be applicable to his specific operating conditions. However, under ordinary circumstances a range of from about 0.5 parts to 2.0 parts, by weight, of cationic agents per 1.0 part of sizing agent is usually adequate. Thus, the cationic agent may be present in a quantity which is at least 0.025 percent of the dry weight of the pulp in the paper.

It should also be noted that our novel water repellents may be externally applied to paper from organic solvent solutions and aqueous emulsions by means of conventional tub or calender-stack sizing techniques, etc.

As noted, the actual application to substrates of the novel compositions of this invention may be accomplished by any means capable of effectively depositing or incorporating a small concentration of the repellent. The figure illustrates an external spray application technique wherein nozzle 10 sprays solution 11 of repellent onto substrate 12 which passes through drier 13 to remove solvent.

The following examples will further illustrate the embodiment of this invention. In these examples, all parts given are by weight unless otherwise noted.

EXAMPLE 1

This example illustrates the preparation of a carboxamido-aziridine compound typical of the novel products of this invention.

A reaction vessel fitted with a distillation apparatus combined with a drying tube and means for mechanical agitation was charged with 100 parts of toluene and 43.5 parts of an isocyanate mixture comprising 80 percent, by weight, of 2,4- and 20 percent, by weight, of 2,6- tolylene diisocyanate. The solution was heated to 50° to 60°C. whereupon 67.5 parts of stearyl alcohol were slowly added over a 30 minute period and the resulting mixture maintained at the latter temperature for a period of 60 minutes. The resulting intermediate isocyanate adduct was retained in the toluene solvent.

The latter clear toluene solution was then cooled to about 35° to 40°C. whereupon 10.75 parts of ethylenimine were added thereto over a period of 15 to 20 minutes. In order to counteract the viscosity increase that occurred as the reaction proceeded, 150 to 200 parts of toluene were added to the reaction mix. The reaction was allowed to proceed for an additional 90 minutes while at the above temperature whereupon all traces of the toluene solvent were evaporated, under reduced pressure. The white carboxamido-aziridine compound, i.e. 4-(stearoxy carboxamido)-2-(aziridine carboxamido)toluene, was then scraped, ground into a fine powder, and finally dried, under vacuum, at 25° to 30°C. for a period of 24 hours. The product was recovered in a yield of 96 to 98 percent and had a melting point of 88° to 89°C. It was readily soluble in either 1,2-dichloro-ethane or a 1:1 methanol-benzene solvent system.

EXAMPLE 2 – 11

These examples illustrate the wide variety of reagents and reaction conditions which can be effectively utilized in preparing the novel products of this invention.

A number of different carboxamido-aziridine compounds were prepared, according to the general procedure set forth in Example 1, hereinabove, utilizing a variety of reagents at different concentration levels and under varying reaction conditions. These variables are presented in the following table wherein "Step 1" refers to the reaction between the alcohol reagent and the polyisocyanate in order to form the intermediate isocyanate adduct and "Step 2" refers to the reaction between the isocyanate adduct and an alkylenimine in order to form the carboxamido-aziridine end product.

PARTS

Example No.

Step 1    II III     IV V    VI   VII VIII   IX X    XI

| | | | | | | | | |
|---|---|---|---|---|---|---|---|---|
| 1. lauryl alcohol | 46.5 | — | — | — | — | — | — | — |
| 2. myristyl alcohol | — | 53.5 | — | — | — | — | — | — |
| 3. palmityl alcohol | — | — | 60.5 | — | — | — | — | — |
| 4. A 7:3 mixture of palmityl and stearyl alcohols | — | — | — | 730.0 | — | — | — | — |
| 5. stearyl alcohol | — | — | — | — | — | 67.6 | 27.7 | 100.0 — — |
| 6. benzyl alcohol | — | — | — | 32.4 | — | — | — | — |
| 7. A mixture containing 45%, by wt., of tetrahydroabietyl alcohol, 40%, by wt., of hydroabietyl alcohol and 15%, by wt., of dehydroabietyl alcohol | — | — | — | — | 70.2 | — | — | — |
| 8. An ester-alcohol resulting from the reaction of stearic acid and 1,1,1-trimethylol ethane under nitrogen at 190-200°C. for five hours | — | — | — | — | — | — | — | — 100.0 |
| 9. An isocyanate mixture containing 80%, by weight, of 2,4- and 20%, by weight, of 2,6-tolylene diisocyanate | 43.5 | 43.5 | 43.5 | 496.4 | 52.2 | 34.8 | — | — 63.6 30.6 |
| 10. Polymethylene polyphenyl isocyanate | — | — | — | — | 47.5 | — | — | — |
| 11. Hexamethylene diisocyanate | — | — | — | — | — | 16.8 | — | — |
| 12. toluene | 100.0 | 100.0 | 100.0 | — | 50.0 | 100.0 | 50.0 | — |
| 13. lead octanoate | — | — | — | — | — | 0.05 | — | — |
| a) reaction temp. (°C.) | 50-55 | 50-55 | 50-55 | 65-70 | 55-60 | 60-70 | 50-55 | 70-75 65-70 65-70 |
| b) total reaction time (minutes) | 90 | 90 | 90 | 50 | 55 | 55 | 90 | 38 65 50 |

PARTS

| Step 2 | II | III | IV | V | VI | VII | VIII | IX | X | XI |
|---|---|---|---|---|---|---|---|---|---|---|
| 14. Ethylenimine | 10.75 | 10.75 | 10.75 | 122.6 | 12.9 | 8.6 | 5.37 | 4.38 | — | 7.6 |
| 15. propylenimine | — | — | — | — | — | — | — | — | 15.7 | — |
| c) reaction temp. (°C.) | 60-65 | 60-65 | 60-65 | 60-65 | 65-70 | 75-80 | 65-70 | 60-65 | 50-55 | 65-70 | 65-70 |
| d) total reaction time (minutes) | 90 | 90 | 90 | 20 | 40 | 55 | 9 | 120 | 510 | 20 |
| e) melting point of carboxamido-aziridine end product (°C.) | 64-65 | 72-74 | 74-76 | 34-35 | 63-66 | 73-75 | 92-93 | 96-97 | — | 45-47 |
| f) yield (%) | 96-98 | 96-98 | 96-98 | 96-98 | 96-98 | 96-98 | 96-98 | 96-98 | 96-98 | 96-98 |

The data presented above clearly indicate the effectiveness of the novel process of this invention in the utilization of a wide range of reagents and reaction conditions.

EXAMPLES 12 - 18

These examples illustrate additional reagents and reaction conditions which can be effectively utilized in preparing the novel products of this invention.

A number of different carboxamido-aziridine compounds were prepared, according to the general procedure set forth in Example I, hereinabove, utilizing a variety of reagents at different concentration levels and under varying reaction conditions. These variables are presented in the following table wherein "Step 1" refers to the reaction between the alcohol reagent and the polyisocyanate in order to form the intermediate isocyanate adduct and "Step 2" refers to the reaction between the isocyanate adduct and an alkylenimine in order to form the carboxamido-aziridine end product.

PARTS

| Example Number | 12 | 13 | 14 | 15 | 16 | 17 | 18 |
|---|---|---|---|---|---|---|---|
| Step I: | | | | | | | |
| 1. Pentaerythritol tristearate (ester-alcohol; hydroxyl No. 56-60) | 118.0 | 115.5 | 115.5 | 118.0 | 118.0 | 118.0 | 118.0 |
| 2. An isocyanate mixture containing 80%, by weight, of 2,4-tolylene diisocyanate and 20%, by weight, of 2,6-tolyene diisocyanate | 21.6 | | | | | | |
| 3. Methylene-bis-phenyl isocyanate | | 31.3 | | | | | |
| 4. Isophorone diisocyanate | | | 27.8 | | | | |
| 5. Methylene-bis-cyclohexyl diisocyanate | | | | 32.8 | | | |
| 6. Xylylene diisocyanate | | | | | 23.5 | | |
| 7. Methyl cyclohexylene diisocyanate | | | | | | 22.5 | |
| 8. Commercial dimer diisocyanate having a predominance of 3,4-diamyl-5-(2-undecenylene)-6-nonylene-1-cyclohexene diisocyanate | | | | | | | 75.0 |
| 9. Stannous octanoate | | | 0.045 | 0.049 | 0.035 | 0.034 | 0.113 |
| (a) Reaction temp. (° C.) | 75-80 | 90-115 | 80-90 | 80-86 | 80-86 | 80-81 | 80-82 |
| (b) Total reaction time (minutes) | 150 | 180 | 187 | 198 | 192 | 243 | 213 |
| Step II: | | | | | | | |
| 10. Ethlenimine | 5.65 | 5.65 | 5.65 | 5.65 | 5.65 | 5.65 | 5.65 |
| (c) Reaction temp. (° C.) | 75-80 | 80-84 | 77-87 | 74-82 | 75-91 | 73-81 | 74-81 |
| (d) Total reaction time (minutes) | 60 | 15 | 24 | 20 | 73 | 77 | 60 |
| (e) Melting point of end product (° C.) | 52-55 | 56-57 | 44-45 | 43-45 | 54-57 | 47-50 | 37-39 |
| (f) Yield (percent) | 96-98 | 96-98 | 96-98 | 96-98 | 96-98 | 96-98 | 96-98 |

The data presented above further indicates the effectiveness of the novel process of this invention in the utilization of a wide range of reagents and reaction conditions.

EXAMPLES 19 - 23

These examples illustrate still additional reagents and reaction conditions which can be effectively utilized in preparing the novel products of this invention.

A number of different carboxamido-aziridine compounds were prepared, according to the general procedure set forth in Example I, hereinabove, utilizing a variety of reagents at different concentration levels and under varying reaction conditions. These variables are presented in the following table wherein "Step 1" refers to the reaction between the alcohol reagent and the polyisocyanate in order to form the intermediate isocyanate adduct and "Step 2" refers to the reaction between the isocyanate adduct and an alkylenimine in order to form the carboxamido-aziridine end product.

PARTS

Example No.

| Step I | 19 | 20 | 21 | 22 | 23 |
|---|---|---|---|---|---|
| 1. Glycerol distearate (ester-alcohol; hydroxyl No. 73.1 M.P. 57–58°C.) | 96.2 | — | — | — | — |
| 2. Trimethylol propane distearate (ester-alcohol; hydroxyl No. 82.4, M.P. 37–39°C.) | — | 85.1 | — | — | — |
| 3. Cyclohexanol | — | — | 25.0 | — | — |
| 4. Methanol | — | — | — | 16.0 | — |
| 5. Phenethyl alcohol | — | — | — | — | 30.5 |
| 6. An isocyanate mixture containing 80%, by weight, of 2,4-tolylene diisocyanate and 20%, by weight of 2,6-tolylene diisocyanate | 21.6 | 21.6 | 21.6 | 21.6 | 21.6 |
| 7. Toluene | — | — | 25.0 | — | 43.3 |
| 8. Tetrahydrofuran | — | — | — | 55 | — |
| a) reaction temperature (°C.) | 65–73 | 55–60 | 60–70 | 35–50 | 50–57 |
| b) total reaction time (minutes) | 148 | 160 | 140 | 207 | 228 |

PARTS

Example No.

| Step II | 19 | 20 | 21 | 22 | 23 |
|---|---|---|---|---|---|
| Ethyleneimine | 5.65 | 5.65 | 11.28 | 22.5 | 11.28 |
| c) reaction temperature (°C.) | 73–80 | 50–55 | 65–72 | 40–45 | 50–58 |
| d) total reaction time (minutes) | 82 | 52 | 80 | 168 | 77 |
| e) melting point of end product (°C.) | 48–50 | 40–42 | 80–82 | 130–133 | 115–118 |
| f) Yield (%) | 96–98 | 96–98 | 96–98 | 85–90 | 85–90 |

The data presented hereinabove clearly indicate the effectiveness of the novel process of this invention in the utilization of a wide range of reagents and reaction conditions.

EXAMPLE 24

This example illustrates the effectiveness of the novel materials of this invention when utilized as internal paper sizing agents.

Thus, an aqueous emulsion of each of the sample materials was prepared by first cooking 3.75 parts of the beta-diethyl aminoethyl chloride hydrochloride ether of corn starch in 90 parts of water for a period of 20 minutes; the latter starch ether being a tertiary amine cationic starch derivative which was prepared by means of the procedure set forth in example 1 of U.S. Pat. No. 2,813,093. The pH level of the starch cook was adjusted to 6.5 by the addition of diluted sodium hydroxide and then transferred to a high speed agitator whereupon 2.5 parts of the selected sizing agent were added thereto. Agitation was continued for three minutes and the resulting emulsion was cooled and diluted to a volume of 250 ml. by the addition of cold water. Thus, the resulting stock emulsion contained 1 percent, by weight, of sizing agent and 1.5 percent, by weight, of cationic starch.

A portion of the stock emulsion was then diluted 10 fold and added to an aqueous slurry of the selected pulp having a consistency of 1.5 percent and a pH of about 7.5. Paper sheets were formed and dried in accordance with TAPPI standards, the latter sheets having a basis weight of 55 pounds/ream. A section of each of the paper sheets was then cured at 100° C. for a period of 60 minutes.

In order to demonstrate the excellent properties of both the cured and uncured sized sheets, the following test procedures were employed.

Uranine Dye Test — This test, which was utilized to determine water resistance, involved placing a small amount of uranium dye powder on the upper surface of a swatch of the test paper which was then set afloat on distilled water. As the water was absorbed into the paper, the dye was moistened and thus became sensitive to ultra-violet light. The time, in seconds, required for this ultra-violet sensitivity to occur was thus in direct relation to the water resistance of the paper since a more resistant paper will, of course, retard the moistening of the dye which had been placed upon its upper surface.

Ink Penetration Test — This test involved floating a swatch of the treated paper on a reservoir of ink. The time required for the ink to penetrate the paper such that the ink was visible over a 50 percent area of the upper surface of the paper swatch was noted as the "ink penetration" time. Needless to say, a longer ink penetration time is indicative of increased water resistance on the part of the paper sample.

Lactic Acid Resistance — This test involved treating one side of the sized paper with a methyl orange dye solution and then drying the dyed paper at 100°C. for one minute. The dyed paper was then set afloat, with its dyed surface uppermost, in a container filled with a 20 percent by weight, aqueous lactic acid solution. As the lactic acid was absorbed into the paper, the methyl orange dye turned red. The time, in seconds, required for the entire upper surface to change color was, thus, in direct relation to the lactic acid resistance of the paper.

Paper sheets which either had not been internally sized as well as comparable paper sheets which in this case had been internally sized with rosin-alum systems were also prepared and submitted to the above described test procedures in order to provide a direct comparison with the sheets that were sized with the novel compositions of this invention.

The following table presents the results which were obtained upon submitting the various paper sheets to the described test procedures.

| Sheet No. | Additive | Percent of additive (based on weight of dry pulp) | Pulp | Uranine dye test (time in sec.) | | Lactic acid resistance (time in sec.) | | Ink resistance (time in sec.) | |
|---|---|---|---|---|---|---|---|---|---|
| | | | | Uncured | Cured | Uncured | Cured | Uncured | Cured |
| 1 | None | | Bleached kraft | Immediate | | Immediate | | Immediate | |
| 2 | Product of Ex. 1 / Cationic corn starch | 0.25 / 0.375 | do | 70 | 98 | 450 | 600+ | 2,000+ | 2,000+ |
| 3 | Product of Ex. 1 / Cationic corn starch | 0.50 / 0.75 | do | 85 | 144 | 600+ | 600+ | 2,000+ | 2,000+ |
| 4 | Product of Ex. 1 / Cationic corn starch | 1.00 / 1.50 | do | 87 | 122 | 600+ | 600+ | 2,000+ | 2,000+ |
| 5 | Product of Ex. 2 / Cationic corn starch | 1.00 / 1.50 | do | 34 | 110 | 18 | 600+ | 2,000+ | 2,000+ |
| 6 | Product of Ex. 3 / Cationic corn starch | 1.00 / 1.50 | do | 96 | 168 | 600+ | 600+ | 2,000+ | 2,000+ |
| 7 | Product of Ex. 4 / Cationic corn starch | 1.00 / 1.50 | do | 102 | 121 | 600+ | 600+ | 2,000+ | 2,000+ |
| 8 | Product of Ex. 5 / Cationic corn starch | 1.00 / 1.50 | do | 130 | 153 | 600+ | 600+ | 2,000+ | 2,000+ |
| 9 | Product of Ex. 5 / Cationic corn starch | 1.00 / 1.50 | Unbleached kraft | 165 | 180+ | 600+ | 600+ | | |
| 10 | Product of Ex. 5 / Cationic corn starch | 1.00 / 1.50 | Bleached sulfite | 70 | 92 | 600+ | 600+ | | |
| 11 | Rosin / Alum | 1.00 / 10.00 | Bleached kraft | 60 | 76 | 25 | 50 | 100 | 225 |

The results summarized above clearly indicate the excellent properties exhibited by paper sheets that have been internally sized with the novel compositions of this invention.

EXAMPLE 25

This example illustrates the excellent water repellent properties exhibited by substrates whose surfaces have been treated with the novel carboxamido-aziridine compounds of this invention.

In order to demonstrate the excellent water repellent characteristics of the novel derivatives of this invention, the following test procedure was employed. Thus, cotton broad cloth was treated by means of a padding technique wherein the sample was passed through a 1,2-dichloroethane solution of the selected derivative, squeezed through a nip, heated at 60°C. for 15 minutes in order to evaporate the solvent and thereafter heated at a temperature of 150°C. for a period of 5 minutes in order to cure the thus treated fabric.

The water repellency of the thus treated cotton fabrics was measured by the use of the "Standard Spray Test" of the American Association of Textile Chemists and Colorists — AATCC No. 22 - 1964. In this procedure, a swatch of each of the treated cotton samples was securely fastened to a 6 inch hoop so that it presented a smooth wrinkle-free surface. The test sample was positioned at a 45° angle with its mid-point directly opposite a spray nozzle so that the center of the spray pattern from the nozzle was, accordingly, aligned with the mid-point of the swatch. Thereupon, 250 ml. of distilled water were sprayed onto the sample over a period of 25-30 seconds. The wet pattern which formed on the surface of the test sample was compared with a series of rated standard wet patterns. Each test simple was then assigned the rating of the standard pattern which most closely approximated the pattern of the test sample. The standard patterns were rated according to the following scheme:

100 - no sticking or wetting of upper surface
90 - slight random sticking and wetting of upper surface
80 - wetting of upper surface at spray points
70 - partial wetting of whole of upper surface
50 - complete wetting of whole of upper surface
0 - complete wetting of whole of upper and lower surfaces.

The results of these determinations are presented in the following table:

| Repellent (Example No.) | % of Repellent, as based on weight of cotton fabric | Spray Rating |
|---|---|---|
| Control (untreated cotton swatch) | - | 0 |
| 5 | 1 | 50 |
| 5 | 2 | 50 |
| 5 | 3 | 70 |
| 5 | 4 | 80 |
| 5 | 6 | 80 |
| 6 | 6 | 80 |
| 9 | 1 | 80 |
| 9 | 3 | 100 |
| 11* | 1 | 90 |
| 11* | 3 | 100 |
| 12 | 1 | 100 |
| 13 | 1 | 90 |
| 13 | 2 | 100 |
| 14 | 1 | 70 |
| 14 | 2 | 80 |
| 15 | 1 | 100 |
| 16 | 1 | 100 |

*This repellent was utilized in the padding operation in the form of a 7:3 toluene:isopropanol solution.

The results summarized above clearly show the excellent water repellency exhibited by the novel carboxamido-aziridine compounds of this invention.

Summarizing, it is thus seen that this invention provides for the preparation of novel carboxamido-aziridine compounds which display excellent water repellency properties.

Variations may be made in proportions, procedures and materials without departing from the scope of this invention which is defined by the following claims.

What is claimed is:

1. A carboxamido-aziridine compound selected from the group consisting of:

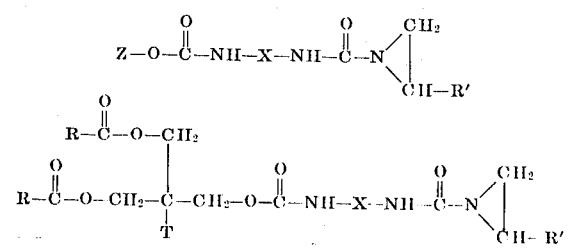

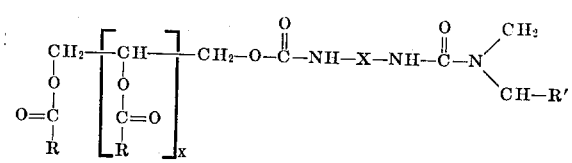

: and $$CH_2-\left[\begin{array}{c}CH\\|\\O\\|\\C=O\\|\\R\end{array}\right]_x CH_2-O-\overset{O}{\underset{\|}{C}}-NH-X-NH-\overset{O}{\underset{\|}{C}}-N\overset{CH_2}{\underset{CH-R'}{\diagdown}}$$

wherein

Z is a radical selected from the group consisting of straight chained and branched alkyl radicals corresponding to the formula $C_nH_{(2n+1)}$ wherein n is an integer having a value of from 1 to 22 inclusive, cycloalkyl, hydroabietyl, dihydroabietyl, dehydrobietyl, tetrahydroabietyl, benzyl and phenethyl radicals;

R is a radical selected from the group consisting of straight chained and branched alkyl radicals corresponding to the formula $C_nH_{(2n+1)}$ wherein n is an integer having a value of from 1 to 22 inclusive, cycloalkyl, hydroabietyl, dihydroabietyl, dehydroabutyl, tetrahydroabietyl, benzyl and phenethyl radicals;

R' is a radical selected from the group consisting of hydrogen radicals and alkyl radicals containing from one to two carbon atoms;

X is a radical selected from the group consisting of alkylene radicals corresponding to the formula $(CH_2)_a$ wherein a is an integer having a value of from 2 to 6 inclusive, tolylene, naphthylene, methylene-bis-(phenyl), propylene-bis-(phenyl), methylene-bis-cyclohexylene, isophorone, phenylene, diphenylene, xylylene, cyclopentylene, cyclohexylene, methyl cyclohexylene, and 3,4-diamyl-5-(2-undecenylene)-6-nonylene-1-cyclohexene radicals;

T is a radical selected from this group consisting of hydrogen, methyl, ethyl and acyloxy methyl radicals wherein said acyloxy component contains from two to 23 carbon atoms; and x is an integer having a value of from 1 to 4 inclusive.

* * * * *

UNITED STATES PATENT OFFICE
CERTIFICATE OF CORRECTION

Patent No. 3,678,035                              Dated July 18, 1972

Inventor(s) Dilip K. Ray-Chaudhuri and Hans H. Stockmann

It is certified that error appears in the above-identified patent and that said Letters Patent are hereby corrected as shown below:

Page 1, item "[45] July 16, 1972" should read:
- - [45] July 18, 1972 - -

Column 1, lines 26 and 30, each of the structures, starting from the radical X, should read:

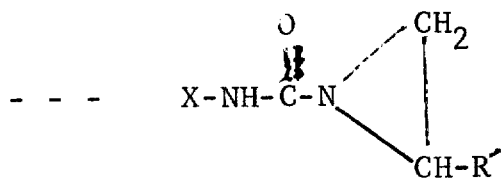

Column 14, claim 1, line 30, the structure, starting from the radical X, should read:

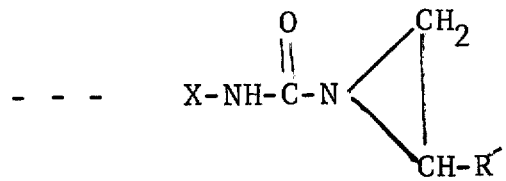

Signed and sealed this 9th day of January 1973.

(SEAL)
Attest:

EDWARD M. FLETCHER, JR.                    ROBERT GOTTSCHALK
Attesting Officer                          Commissioner of Patents